(12) United States Patent
Yamauchi et al.

(10) Patent No.: US 9,789,670 B2
(45) Date of Patent: Oct. 17, 2017

(54) HEAT-SEALABLE LAMINATE AND METHOD FOR PRODUCING SAME

(75) Inventors: Kunio Yamauchi, Osaka (JP); Isao Iwaya, Osaka (JP)

(73) Assignee: NISSIN FOODS HOLDINGS CO., LTD., Osaka (JP)

(*) Notice: Subject to any disclaimer, the term of this patent is extended or adjusted under 35 U.S.C. 154(b) by 59 days.

(21) Appl. No.: 13/388,350

(22) PCT Filed: Aug. 11, 2010

(86) PCT No.: PCT/JP2010/063644
§ 371 (c)(1),
(2), (4) Date: Apr. 16, 2012

(87) PCT Pub. No.: WO2011/019056
PCT Pub. Date: Feb. 17, 2011

(65) Prior Publication Data
US 2012/0189790 A1    Jul. 26, 2012

(30) Foreign Application Priority Data
Aug. 11, 2009   (JP) .................................. 2009-186758

(51) Int. Cl.
*B05D 1/26*   (2006.01)
*B32B 27/10*  (2006.01)
(Continued)

(52) U.S. Cl.
CPC .............. *B32B 27/36* (2013.01); *B32B 27/10* (2013.01); *B32B 29/00* (2013.01);
(Continued)

(58) Field of Classification Search
CPC .......... B32B 27/10; B32B 27/36; B32B 29/00
(Continued)

(56) References Cited

U.S. PATENT DOCUMENTS 5,003,142 A * 3/1991 Fuller ........................ 219/730
5,779,962 A   7/1998 Andraschko et al.
(Continued)

FOREIGN PATENT DOCUMENTS

CA    2625894    9/2008
CN    1214650    4/1999
(Continued)

OTHER PUBLICATIONS

Swedish Office Action issued with respect to counterpart Swedish Application No. 1250108-6 dated Dec. 27, 2012.
(Continued)

*Primary Examiner* — Alexander Weddle
(74) *Attorney, Agent, or Firm* — Greenblum & Bernstein, P.L.C.

(57) ABSTRACT

[Problems to be Solved] To coat homopolyethylene terephthalate, which is inexpensive and easily available, on a paper base material directly, not via an adhesive layer, by extrusion coating, thereby providing a paper laminate having heat sealability and having a homopolyethylene terephthalate coating of a uniform film thickness formed thereon.

[Means to Solve the Problems] A method for producing a paper laminate having a coating comprising homopolyethylene terephthalate formed on at least one surface of a paper base material by extrusion coating is characterized in that an air gap L, expressed as a distance from a lip opening of a T-die to a paper base material B, is 25 cm or less.

1 Claim, 1 Drawing Sheet

(51) Int. Cl.
  *B32B 27/36* (2006.01)
  *B32B 29/00* (2006.01)
(52) U.S. Cl.
  CPC ..... *B32B 2439/70* (2013.01); *Y10T 428/1303* (2015.01); *Y10T 428/24612* (2015.01); *Y10T 428/264* (2015.01); *Y10T 428/2826* (2015.01)
(58) Field of Classification Search
  USPC .......................................................... 427/358
  See application file for complete search history.

(56) References Cited

U.S. PATENT DOCUMENTS

| | | | | |
|---|---|---|---|---|
| 5,985,080 | A | * | 11/1999 | Kobayashi et al. ..... 156/244.24 |
| 2004/0009360 | A1 | * | 1/2004 | Longo ................... B29C 55/023 428/476.3 |
| 2004/0245138 | A1 | * | 12/2004 | Penttinen et al. ......... 206/484.1 |
| 2008/0254266 | A1 | * | 10/2008 | Hachisuka et al. ........... 428/200 |
| 2009/0123756 | A1 | * | 5/2009 | Hashimoto et al. .......... 428/409 |
| 2009/0273115 | A1 | * | 11/2009 | Morikawa et al. ...... 264/177.18 |

FOREIGN PATENT DOCUMENTS

| | | | |
|---|---|---|---|
| CN | 101029121 | | 9/2007 |
| EP | WO2009013284 A1 | * | 1/2009 |
| JP | 57043816 A | * | 3/1982 |
| JP | 06-15784 | | 1/1994 |
| JP | 2003-200920 | | 7/2003 |
| JP | 2003-311888 | | 11/2003 |
| JP | 3749000 | | 12/2005 |
| JP | 2007-091323 | | 4/2007 |
| JP | 2007-144688 | | 6/2007 |
| JP | 2007-176539 | | 7/2007 |
| JP | 2008-024372 | | 2/2008 |
| JP | 2008-119858 | | 5/2008 |
| JP | 2008-119859 | | 5/2008 |
| JP | 2008-296383 | | 12/2008 |
| WO | WO 2007114458 A1 | * | 10/2007 |

OTHER PUBLICATIONS

"International Search Report (ISR).", Application No. PCT/JP2010/063644, Date: Oct. 12, 2010, pp. 1-2.

China Office action in CN201080035518.9, dated Jun. 20, 2014 along with an english translation thereof.

China Office action in CN 201080035518.9, dated Jan. 10, 2014 along with an english translation thereof.

* cited by examiner

1: unknown    2: cyclohexanone    3: dodecane
4: terpenes   5: tetradecane      6: terpenes
7: pentadecane 8: hexadecane      9: octadecane
10: unknown   11: alkanes         12: eicosane
13: alkanes   14: docosane        15: alkanes

HEAT-SEALABLE LAMINATE AND METHOD FOR PRODUCING SAME

TECHNICAL FIELD

This invention relates to a heat-sealable laminate and a method for producing it. More specifically, the present invention relates to a laminate excellent in heat resistance, aroma barrier properties, heat sealability, and economy, the laminate being produced by forming general-purpose homopolyethylene terephthalate directly on a paper base material; and a method for producing the laminate.

BACKGROUND ART

To impart various properties, such as water resistance and heat sealability, to a container made of paper (paper container), it has been common practice to apply a resin coating to a paper base material.

In such a laminate with a resin coating applied to a paper base material, a polyolefin such as polyethylene or polypropylene is generally used as a coating resin, because it is excellent in workability, and also excellent in adhesion to paper and melt extrudability. However, polyolefin is not fully satisfactory in terms of heat resistance, properties as a barrier against an offensive odor, aroma barrier properties, etc. which are necessary functions for food containers, so that its uses are limited.

To solve such problems, a proposal has been made to provide a paper base material with a coating comprising a polyester resin. However, coating a homopolyethylene terephthalate resin (may hereinafter be referred to as "homo-PET"), which is a general-purpose polyester, on a paper base material directly, not via an adhesive layer, poses difficulty in obtaining stable film-forming properties. A laminate having homopolyethylene terephthalate coated directly on a paper base material has not been commercialized.

Thus, Patent Document 1 to be described later, for example, proposes a method for producing a laminate, which comprises extrusion-coating a polyester on a fibrous base material, wherein a polyester consisting essentially of ethylene terephthalate units and having a melt viscosity ratio $\eta_{50}/\eta_{950}$ ($\eta_{50}$ is a melt viscosity at 280° C. and a shear rate of 50 s$^{-1}$, and $\eta_{950}$ is a melt viscosity at 280° C. and a shear rate of 950 s$^{-1}$) in the range of $2.0<\eta_{50}/\eta_{950}<3.0$ and an inherent viscosity in the range of 0.5 to 1.4 dl/g is used as the polyester, and the extrusion coating is performed under the following conditions: a die downward extrusion temperature of 300 to 340° C., a melt extension ratio of 25 or less, a coating thickness of 20 μm or more, and a roll application line pressure of 5 to 50 kg/cm. This method is described as being capable of producing, with high stability, a polyester coated paper having a uniform film thickness and excellent interlaminar bonding strength.

Another proposal has been made for a multilayer polyester-based laminated paper having polyethylene terephthalate laminated to a paper base material via a polyethylene terephthalate copolymer resin having a density of less than 1.35 g/cm$^3$ (Patent Document 2).

PRIOR ART DOCUMENTS

Patent Documents

Patent Document 1: Japanese Patent No. 3749000
Patent Document 2: JP-A-2003-311888

SUMMARY OF THE INVENTION

Problems to be Solved by the Invention

The invention described in the above-mentioned Patent Document 1, however, uses a special polyester resin having special melt properties. A special polyester resin, such as a copolymer polyester resin or a blend resin, is generally expensive, and is often prepared in a special manner. Thus, such a special polyester resin is difficult to acquire with ease. Demand is growing for a paper laminate having homopolyethylene terephthalate coated on a paper base material directly, not via an adhesive layer, the homopolyethylene terephthalate being inexpensive and easily available.

The above Patent Document 2 describes that the heat sealability of homopolyethylene terephthalates to each other can be ensured via a polyethylene terephthalate copolymer resin, but that the heat sealability of homopolyethylene terephthalates to each other cannot be obtained at all, if such a copolymer resin is not used.

It is an object of the present invention, therefore, to provide a heat-sealable laminate excellent in the heat sealability of homopolyethylene terephthalate surfaces to each other, the laminate having a coating directly formed on a paper base material, the coating comprising homopolyethylene terephthalate and having a uniform film thickness.

It is another object of the present invention to provide a method for producing a laminate, which can melt-extrude homopolyethylene terephthalate directly on a paper base material by the extrusion coating process, without causing edge or selvage waves, etc.

Means for Solving the Problems

According to the present invention, there is provided a heat-sealable laminate characterized in that homopolyethylene terephthalate is directly coated on at least one surface of a paper base material.

In the heat-sealable laminate of the present invention, it is preferred that 1. a coating composed of the homopolyethylene terephthalate is applied by an extrusion coating process;
2. the inherent viscosity of the homopolyethylene terephthalate is in the range of 0.72 to 0.84 dL/g;
3. the coating composed of the homopolyethylene terephthalate has a thickness of 10 to 60 μm; and
4. the thickness of the coating composed of the homopolyethylene terephthalate varies in a range of less than ±20%.

It goes without saying that the paper base material may have an aluminum foil laminated to its surface.

The present invention also provides a container formed by superposing the homopolyethylene terephthalate-coated surfaces of the laminate, and heat-sealing them.

The present invention further provides a method for producing a paper heat-sealable laminate having a coating composed of homopolyethylene terephthalate formed on at least one surface of a paper base material by an extrusion coating process, characterized in that an air gap, expressed as a distance from a lip opening of a T-die to the paper base material, is 25 cm or less.

In the method for producing the heat-sealable laminate according to the present invention, it is preferred that the extrusion temperature of the homopolyethylene terephthalate during melt extrusion in the extrusion coating process be in the range of Tm+25 to Tm+60° C. based on the melting point (Tm) of the homopolyethylene terephthalate, and the extrusion pressure be in the range of 3.5 to 6.5 MPa. An aluminum foil may be laminated to the surface of the paper base material.

Effects of the Invention

According to the heat-sealable laminate of the present invention, the coating of a uniform film thickness comprising inexpensive and easily available homopolyethylene terephthalate is coated on the paper base material directly, without an adhesive layer being interposed therebetween. This brings the advantage of good economy.

The heat-sealable laminate of the present invention has a heat-sealable homo-PET coating formed on the surface. Thus, the laminates are superposed, and heat-sealed, whereby a container can be easily formed. Particularly, the heat sealing of the homo-PET/homo-PET surfaces, whose heat sealing has hitherto been difficult, can be performed at a relatively low temperature.

These facts are clear also from the results of the Examples which will be described later. That is, in the heat-sealable laminate of the present invention, the heat sealing of the homo-PET/homo-PET surfaces can be performed reliably at a heat sealing temperature of 190° C. or higher, and an excellent heat seal may be obtained even at a low temperature of 160° C. (Examples 1 to 3, 7 to 14). On the other hand, in a laminate produced by a method, in which the air gap is great and whose extrusion temperature does not fulfills the present invention, a reliable heat seal of the homo-PET/homo-PET surfaces has not been obtained even at 190° C. (Comparative Example 1 and Comparative Example 2).

The homopolyethylene terephthalate used in the present invention is excellent in heat resistance as compared with copolymer polyesters as well as polyolefins which have so far been used in coating resins. Thus, a container composed of the heat-sealable laminate of the present invention can be put to microwave heat-cooking uses including fats and oils. Moreover, the homopolyethylene terephthalate is excellent in odor barrier properties and aroma barrier properties. Thus, a container composed of the laminate of the present invention has excellent flavor retaining properties.

These facts are evident also from the results of Example 19 to be described later. That is, a container composed of a laminate having polyethylene (PE) laminated thereto, shown in Comparative Example 6, showed the migration of p-dichlorobenzene to the interior of the container. Containers composed of laminates produced by the manufacturing method of the present invention in Examples 1 and 15 to 18, on the other hand, clearly have high barrier properties comparable to those of a container (Comparative Example 7) composed of a laminate formed by stacking biaxially oriented homo-PET films which have been known to show high barrier properties.

Even when a container composed of the laminate of the present invention, which is excellent in resistance to solving-out or elution resistance, accommodates alcohol-containing contents, the container has no possibility of solving out impurities attributed to the homo-PET coating into the contents, and does not impair the flavor of the contents.

These facts are clear also from the results of Example 20 to be described later. That is, ethanol was accommodated in each of a container composed of the heat-sealable laminate of the present invention, and a container composed of a laminate having polyethylene (PE) coated on a paper base material. In the heat-sealable laminate of the present invention, impurity components ascribed to the homo-PET coating were scarcely detected in the accommodated ethanol. On the other hand, various impurity components ascribed to PE were detected in the ethanol accommodated in the PE-coated container. These impurity components are likely to impair the purity of ethanol. As seen from these findings, when the laminate of the present invention is used as a base material for containers for foods and drinks, the laminate clearly excels in the property of maintaining flavor.

In the method for producing the laminate of the present invention, it is an important feature to set the air gap at 25 cm or less during extrusion of a molten resin film of homopolyethylene terephthalate. On this occasion, it is particularly preferred to adjust the value of the extrusion temperature or the extrusion pressure of the molten resin to that in a specific range. By so doing, it becomes possible to ensure the excellent heat-sealability of homopolyethylene terephthalates to each other and, even when general-purpose homopolyethylene terephthalate is used, the occurrence of selvage waves can be suppressed. Thus, the coating with excellent adhesion to the paper base material can be formed directly on the surface of the paper base material. This has made it possible to produce, with high productivity, a heat-sealable laminate in which a coating comprising homopolyethylene terephthalate is directly formed on a paper base material, the laminate whose commercialization has so far been difficult.

The method of producing the laminate according to the present invention provides excellent film-forming properties, and is restrained in the occurrence of selvage waves and neck-in. Thus, this method can perform lamination at a relatively high speed, and can produce the laminate of the present invention with good productivity.

Figure 1:
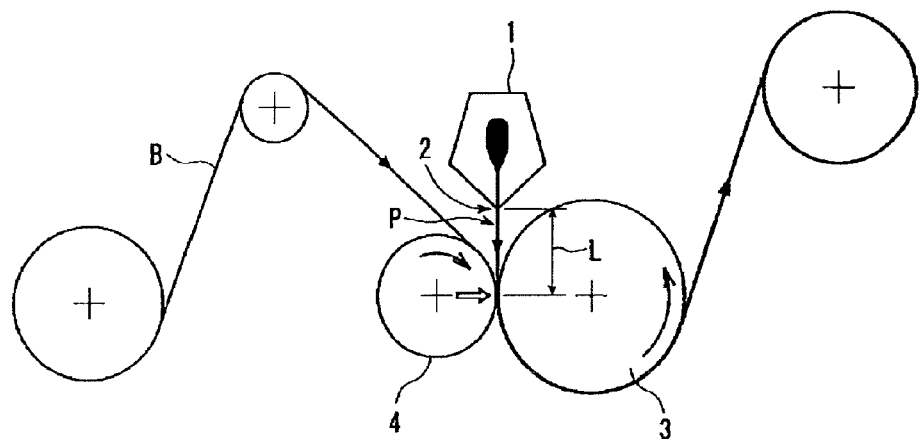
FIG. 1 is a schematic view showing the layout of an example of an apparatus used in the method for producing the laminate of the present invention.

MODE FOR CARRYING OUT THE INVENTION (Homopolyethylene Terephthalate)

In the laminate of the present invention, it is an important feature that homopolyethylene terephthalate is directly coated on at least one surface of a paper base material.

The homopolyethylene terephthalate used in the laminate of the present invention refers to general-purpose polyethylene terephthalate which is formed by polycondensation of ethylene glycol as a diol component and terephthalic acid as a dicarboxylic acid component, and which does not positively contain other copolymer component. This homopolyethylene terephthalate is not meant to exclude impurity components which are formed as by-products during preparation of polyethylene terephthalate.

This homopolyethylene terephthalate generally has a glass transition temperature (Tg) of about 67° C. In the present invention, however, it is preferred that homopolyethylene terephthalate having Tg in the range of about 67° C. or higher be used.

It is important in terms of film-forming properties that the inherent viscosity (IV) of the homopolyethylene terephthalate used in the laminate of the present invention be in the range of 0.72 to 0.84 dL/g, particularly 0.80 to 0.83 dL/g. If the inherent viscosity is lower than this range, the film-forming properties will be poor. If the inherent viscosity is higher than this range, poor extrudability will arise.

Further, the homopolyethylene terephthalate used in the laminate of the present invention can incorporate compounding agents for film publicly known per se, for example, anti-blocking agents, antistatic agents, lubricants, antioxidants, and ultraviolet absorbers, in accordance with publicly known formulations.

(Paper Base Material)

As the paper base material used in the laminate of the present invention, paperboards conventionally used in paper containers can all be used, and various forms of them can be adopted according to uses. For example, ivory board, cup stock, Manila board, boxboard, cardboard, and synthetic paper can also be used, although these are not limitative. The materials cited here may be coated or uncoated.

The grammage or basis weight of the base paper or board is not limited, but preferably, it is generally in the range of 180 to 500 g/m$^2$. If the basis weight is less than this range, the mechanical strength of the resulting container is lacking. If the basis weight is greater than the above range, on the other hand, the resulting container is so heavy that its handleability and economy are poor and its formability is also inferior.

To enhance the wettability of the surface of the paper base material and improve its adhesion to homopolyethylene terephthalate, the paper base material may be subjected to surface treatment such as corona discharge treatment, flame treatment, plasma processing, or ozonization.

Further, the surface of the paper base material may have an aluminum foil laminated thereto. In the method for producing the laminate of the present invention, it becomes possible to form a coating which has adhesion not only to the surface of the paper base material, but also to the surface of the aluminum foil.

To laminate the aluminum foil to the paper base material, a publicly known method, such as dry lamination using an adhesive, can be used.

(Laminate)

In the laminate of the present invention, a coating layer comprising the above-mentioned homopolyethylene terephthalate (may hereinafter be referred to simply as "the homo-PET layer") is formed on at least one surface of the paper base material.

The thickness of the homo-PET layer cannot simply be defined depending on the uses of the laminate, the shape of a container formed from the laminate, and so on. However, from the aspect of film-forming properties, heat resistance, water resistance, aroma barrier properties, or heat-sealability, its thickness is preferably in the range of 10 to 60 μm. A more preferred range is 12 to 50 μm.

In the laminate of the present invention, the homo-PET layers may be formed on both surfaces of the paper base material, or the homo-PET layer may be formed on only one surface thereof. In this case, other synthetic resin film may be laminated to the surface where the homo-PET layer is not formed. Examples of such a synthetic resin film are a polyethylene terephthalate film, a nylon film, and a polypropylene film, and these films may be oriented. Any of these synthetic resin films can be laminated by a publicly known method such as dry lamination or extrusion lamination.

(Method for Producing Laminate)

In order to coat the above-mentioned homopolyethylene terephthalate stably on the surface of the paper base material directly, without using an adhesive or the like, in the method for producing the laminate of the present invention, it is important to select processing conditions in laminating a molten resin film of homopolyethylene terephthalate to the paper base material by the extrusion coating process. Particularly, the distance from the lip opening of a T-die to the surface of the paper base material is of importance. That is, it is important that the distance from the lip opening of the T-die to the surface of the paper base material (i.e., air gap) be set at a value in the range of 25 cm or less, preferably 5 to 20 cm.

Moreover, the extrusion temperature of the molten resin extruded from the extruder is preferably set at a value in the range of Tm+25° C. to Tm+60° C., particularly Tm+30° C. to Tm+50° C., based on the melting point (Tm) of the homopolyethylene terephthalate used.

Furthermore, the extrusion pressure during extrusion is preferably set at 3.5 to 6.5 MPa, particularly 4.0 to 6.0 MPa.

Preferably, the deviation of the actual measured temperature from each temperature setting should be small. Pressure adjustment as well should preferably be made precisely.

By setting the parameters in the above ranges, the occurrence of film waves can be suppressed, and the laminate excellent in the uniformity of the film thickness or excellent in the adhesion of the coating can be produced, as stated earlier. These facts will become clear also from the results of the Examples to be described later.

That is, as clear from the results of the Examples to be described later, if the air gap is larger than 25 cm, selvage or edge waves, namely, lateral sways or waves of both edges or selvages of the film, occur in a width of 4 mm or more, and the range of fluctuations in the film thickness is ±20% or more of the desired thickness, so that a film (homo-PET layer) of a uniform thickness cannot be formed (Comparative Example 1, Table 1). Moreover, the heat-sealability is also insufficient (Comparative Example 1, Table 4). If the extrusion temperature of homopolyethylene terephthalate during melt extrusion deviates from the range of Tm+25° C. to Tm+60° C., a coating of a uniform film thickness cannot be formed, and the resulting film is clearly inferior in selvage waviness and adhesion to that fulfilling the above ranges (Comparative Examples 2 and 3, Table 2). If the extrusion pressure deviates from the range of 3.5 to 6.5 MPa, moreover, the resulting film is clearly unsatisfactory in terms of selvage waviness and film thickness uniformity in comparison with that meeting the above ranges (Comparative Examples 4 and 5, Table 3).

In the method for producing the laminate of the present invention which satisfies all of the above-mentioned conditions, by contrast, the width of selvage or edge waves is restricted to less than 4 mm, the range of fluctuations in the film thickness is as narrow as less than ±20% of the desired film thickness, and the adhesion is clearly excellent (Examples 1 to 18).

FIG. 1 is a schematic view of an example of an apparatus used in the method for producing the laminate of the present invention. Homopolyethylene terephthalate is melt-kneaded by an extruder (not shown), and extruded as a molten resin film P from a lip 2 of a T-die 1 onto the surface of a paper base material B. Then, the extruded film P is nipped between a chill roll 3 and a pressure roll 4, whereby the laminate of the present invention is produced. The air gap is expressed as the distance L from the lip 2 of the T-die to the surface of the paper base material B.

In the present invention, after the homo-PET molten resin film P is extruded onto the paper base material B, it is nipped between the chill roll 3 and the pressure roll 4, as stated above. It is desirable on this occasion that the homo-PET layer be quenched by the chill roll to suppress the crystallization of the homopolyethylene terephthalate. This enables the heat-sealability of the homo-PET layer to be ensured. The surface temperature of the chill roll is preferably in the range of 10 to 25° C., although it is not limited.

It is also important to maintain the extrusion pressure of the molten resin film at a constant value, and it is additionally desirable to provide a gear pump between the extruder and the T-die, although this is not illustrated.

As the die for extruding the homopolyethylene terephthalate, use can be made of a die generally used for extrusion coating of resin. Preferably, the opening width of the die lip is in the range of 0.4 to 1.4 mm, and the width of the die is in the range of 90 to 180 cm. Under the conditions of the present invention, moreover, lamination at a line speed of 50 to 100 m/min is preferred in terms of a uniform film thickness and the adhesion of the homo-PET layer.

(Container)

A container composed of the laminate of the present invention is produced by superposing the homo-PET layers of the laminate of the present invention, and heat-sealing the superposed regions. In this manner, a container of a publicly known shape, such as a cup-shaped, tray-shaped or pouch-shaped one, can be formed.

EXAMPLES

The present invention will be described concretely by taking examples. However, the present invention is in no way limited to the scope of these examples.

Example 1

An extrusion laminator was adjusted so that an air gap with respect to a die (width: about 110 cm) having a lip opening width adjusted to 0.8 mm (the air gap=the distance from the lip opening of a T-die to a cup stock base paper to be coated) would be 10 cm. Homopolyethylene terephthalate at an extrusion temperature of 300° C. was extruded from the die at an extrusion pressure of 6.0 MPa, and coated on a cup stock base paper (corona discharge treated; basis weight 320 g/m$^2$). The homopolyethylene terephthalate used in Examples 1 to 14 and Comparative Examples 1 to 5 was one having an inherent viscosity of 0.83 dL/g and a melting point of 250° C. (NOVAPEX BK6180, produced by Mitsubishi Chemical Corp.).

The coating thickness of the homo-PET was 25 μm, and the coating line speed was 65 m/min. Simultaneously with the coating of the base paper, the coated base paper was passed between a chill roll (surface temperature: 22° C.) and a rubber roll to complete a laminate. In connection with these steps, the state of the extruded laminate was evaluated. The results are shown in Table 1.

Example 2

The same procedure as in Example 1 was performed, except that the air gap was set at 5 cm. The state of the extruded laminate was evaluated. The results are shown in Table 1.

Example 3

The same procedure as in Example 1 was performed, except that the air gap was set at 15 cm. The state of the extruded laminate was evaluated. The results are shown in Table 1.

Example 4

The same procedure as in Example 1 was performed, except that the air gap was set at 20 cm. The state of the extruded laminate was evaluated. The results are shown in Table 1.

Example 5

The same procedure as in Example 1 was performed, except that the air gap was set at 25 cm. The state of the extruded laminate was evaluated. The results are shown in Table 1.

Example 6

The same procedure as in Example 1 was performed, except that the air gap was set at 15 cm and that the extrusion temperature of the homopolyethylene terephthalate was set at 280° C. The state of the extruded laminate was evaluated. The results are shown in Table 2.

Example 7

The same procedure as in Example 1 was performed, except that the air gap was set at 15 cm and that the extrusion temperature of the homopolyethylene terephthalate was set at 290° C. The state of the extruded laminate was evaluated. The results are shown in Table 2.

Example 8

The same procedure as in Example 1 was performed, except that the air gap was set at 15 cm and that the extrusion temperature of the homopolyethylene terephthalate was set at 300° C. The state of the extruded laminate was evaluated. The results are shown in Table 2.

Example 9

The same procedure as in Example 1 was performed, except that the air gap was set at 15 cm and that the extrusion temperature of the homopolyethylene terephthalate was set at 310° C. The results are shown in Table 2.

Example 10

The same procedure as in Example 1 was performed, except that the air gap was set at 15 cm and that the extrusion pressure was set at 4.0 MPa. The state of the extruded laminate was evaluated. The results are shown in Table 3.

Example 11

The same procedure as in Example 1 was performed, except that the air gap was set at 15 cm and that the extrusion pressure was set at 4.5 MPa. The state of the extruded laminate was evaluated. The results are shown in Table 3.

Example 12

The same procedure as in Example 1 was performed, except that the air gap was set at 15 cm and that the extrusion pressure was set at 5.0 MPa. The state of the extruded laminate was evaluated. The results are shown in Table 3.

Example 13

The same procedure as in Example 1 was performed, except that the air gap was set at 15 cm and that the extrusion pressure was set at 5.5 MPa. The state of the extruded laminate was evaluated. The results are shown in Table 3.

Example 14

The same procedure as in Example 1 was performed, except that the air gap was set at 15 cm and that the extrusion pressure was set at 6.0 MPa. The state of the extruded laminate was evaluated. The results are shown in Table 3.

Comparative Example 1

The same procedure as in Example 1 was performed, except that the air gap was set at 30 cm. The state of the extruded laminate was evaluated. The results are shown in Table 1.

The state of the extruded laminate was evaluated. The results are shown in Table 1.

Comparative Example 2

The same procedure as in Example 1 was performed, except that the air gap was set at 15 cm and that the extrusion temperature of the homopolyethylene terephthalate was set at 270° C. The state of the extruded laminate was evaluated. The results are shown in Table 2.

Comparative Example 3

The same procedure as in Example 1 was performed, except that the air gap was set at 15 cm and that the extrusion temperature of the homopolyethylene terephthalate was set at 320° C. The state of the extruded laminate was evaluated. The results are shown in Table 2.

Comparative Example 4

The same procedure as in Example 1 was performed, except that the air gap was set at 15 cm and that the extrusion pressure was set at 3.5 MPa. The state of the extruded laminate was evaluated. The results are shown in Table 3.

Comparative Example 5

The same procedure as in Example 1 was performed, except that the air gap was set at 15 cm and that the extrusion pressure was set at 6.5 MPa. The state of the extruded laminate was evaluated. The results are shown in Table 3.

(Evaluation Methods)

1. Selvage Wave Width of the Homo-PET Layer
   ○ . . . Selvage wave width of within 2 mm
   Δ . . . Selvage wave width of less than 4 mm
   X . . . Selvage wave width of 4 mm or more
   The laminate with a selvage wave width of less than 4 mm can be put to practical use.
2. Uniformity of the Film Thickness
   ○ . . . The range of variation in the film thickness of the homo-PET layer was within ±15% of the desired film thickness.
   Δ . . . The range of variation in the film thickness of the homo-PET layer was less than ±20% of the desired film thickness.
   X . . . The range of variation in the film thickness of the homo-PET layer was equal to or more than ±20% of the desired film thickness.
   The laminate with a range of variation of less than ±20% can be put to practical use.
3. Adhesion
   ○ . . . There was sufficient adhesion between the homo-PET layer and the paper base material.
   Δ . . . There was adhesion between the homo-PET layer and the paper base material.
   X . . . In some cases, slight peeling occurred between the homo-PET layer and the paper base material.
   The laminate without peeling between the homo-PET layer and the paper base material can be put to practical use.
4. Heat-Sealability The homopolyethylene terephthalate-laminated surfaces were superposed, and a heating plate adjusted to each of heat-sealing temperatures of 160° C., 170° C., 190° C. and 220° C. was held at a pressure of 2 kg/cm$^2$ for 2 seconds by an impulse sealer, to fusion-bond or weld the composite, thereby heat-sealing it.

Then, the heat-sealed surfaces of the resulting laminate subjected to heat sealing were stripped, and the state of breakage of the surface at the paper base material was observed. Evaluation criteria are as follows:
   ◉ . . . Breakage at the paper base material surface was 90% or more of the welded area
   ○ . . . Breakage at the paper base material surface was 60% or more, but less than 90% of the welded area
   Δ . . . Breakage at the paper base material surface was 30% or more, but less than 60% of the welded area
   X . . . Breakage at the paper base material surface was less than 30% of the welded area

TABLE 1

| | Air gap (cm) | Selvage wave width of coated film | Uniformity of film thickness | Adhesion |
| --- | --- | --- | --- | --- |
| Ex. 2 | 5 | ○ | Δ | ○ |
| Ex. 1 | 10 | ○ | ○ | ○ |
| Ex. 3 | 15 | ○ | ○ | ○ |
| Ex. 4 | 20 | ○ | ○ | ○ |
| Ex. 5 | 25 | Δ | Δ | Δ |
| Comp. Ex. 1 | 30 | X | X | Δ |

(PET: BK6180, Extrusion temperature: 300° C., Extrusion pressure: 6.0 MPa)

TABLE 2

| | Melting temperature (° C.) | Selvage wave width of coated film | Uniformity of film thickness | Adhesion |
| --- | --- | --- | --- | --- |
| Comp. Ex. 2 | 270 | Δ | X | Δ |
| Ex. 6 | 280 | ○ | ○ | ○ |
| Ex. 7 | 290 | ○ | ○ | ○ |
| Ex. 8 | 300 | ○ | ○ | ○ |
| Ex. 9 | 310 | Δ | Δ | ○ |
| Comp. Ex. 3 | 320 | X | X | Δ |

(PET: BK6180, Air gap: 15 cm, Extrusion pressure: 6.0 MPa)

TABLE 3

|  | Pressure (MPa) | Selvage wave width of coated film | Uniformity of film thickness | Adhesion |
|---|---|---|---|---|
| Comp. Ex. 4 | 3.5 | Δ | Δ | Δ |
| Ex. 10 | 4.0 | ◯ | Δ | ◯ |
| Ex. 11 | 4.5 | ◯ | ◯ | ◯ |
| Ex. 12 | 5.0 | ◯ | ◯ | ◯ |
| Ex. 13 | 5.5 | ◯ | ◯ | ◯ |
| Ex. 14 | 6.0 | ◯ | ◯ | ◯ |
| Comp. Ex. 5 | 6.5 | Δ | Δ | ◯ |

(PET: BK6180, Air gap: 15 cm, Extrusion temperature: 300° C.)

TABLE 4

| | Homo-PET surface/homo-PET surface | | | |
|---|---|---|---|---|
| | 160° C. | 170° C. | 190° C. | 220° C. |
| Ex. 1 | ⊚ | ⊚ | ⊚ | ⊚ |
| Ex. 3 | ⊚ | ⊚ | ⊚ | ⊚ |
| Ex. 4 | ⊚ | ⊚ | ⊚ | ⊚ |
| Ex. 5 | Δ | ◯ | ⊚ | ⊚ |
| Ex. 6 | ◯ | ◯ | ⊚ | ⊚ |
| Ex. 7 | ⊚ | ⊚ | ⊚ | ⊚ |
| Ex. 8 | ⊚ | ⊚ | ⊚ | ⊚ |
| Ex. 9 | ⊚ | ⊚ | ⊚ | ⊚ |
| Ex. 11 | ⊚ | ⊚ | ⊚ | ⊚ |
| Ex. 12 | ⊚ | ⊚ | ⊚ | ⊚ |
| Ex. 13 | ⊚ | ⊚ | ⊚ | ⊚ |
| Comp. Ex. 1 | X | X | Δ | ◯ |
| Comp. Ex. 2 | Δ | Δ | ◯ | ⊚ |

Examples 15 to 18

The homopolyethylene terephthalates used were homopolyethylene terephthalate having an inherent viscosity of 0.88 dL/g and a melting point of 250° C. (NEH-2070, produced by UNITIKA, LTD.) (Example 15), homopolyethylene terephthalate having an inherent viscosity of 0.80 dL/g and a melting point of 236° C. (BR8040, produced by SK Chemicals Co., Ltd.) (Example 16), homopolyethylene terephthalate having an inherent viscosity of 0.76 dL/g and a melting point of 252° C. (TRN-8550FF, produced by Teijin Chemicals Ltd.) (Example 17), and homopolyethylene terephthalate having an inherent viscosity of 0.72 dL/g and a melting point of 251° C. (NES-2040, produced by UNITIKA, LTD.) (Example 18). The extrusion conditions were the same as those in Example 1, except that the extrusion temperature was 290° C. only for BR8040 of SK Chemicals. Under these conditions, laminates were prepared in the same manner as in Example 1, and evaluated in the same manner as in Example 1. The results are shown in Tables 5 and 6.

TABLE 5

|  | Pressure | Selvage wave width of coated film | Uniformity of film thickness | Adhesion |
|---|---|---|---|---|
| Ex. 15 | 5.0 | ◯ | ◯ | ◯ |
| Ex. 16 | 5.0 | ◯ | ◯ | ◯ |
| Ex. 17 | 5.0 | ◯ | ◯ | ◯ |
| Ex. 18 | 5.0 | ◯ | ◯ | ◯ |

TABLE 6

| | Homo-PET surface/homo-PET surface | | | |
|---|---|---|---|---|
| | 160° C. | 170° C. | 190° C. | 220° C. |
| Ex. 15 | ⊚ | ⊚ | ⊚ | ⊚ |
| Ex. 16 | ⊚ | ⊚ | ⊚ | ⊚ |
| Ex. 17 | ⊚ | ⊚ | ⊚ | ⊚ |
| Ex. 18 | ⊚ | ⊚ | ⊚ | ⊚ |

Examples 19 to 23, Comparative Examples 6 and 7

Using two of each of the various laminates obtained in Example 1 and Examples 15 to 18 (base paper 300 g/m²/homo-PET 25 μm, A4-size), the homo-PET laminated surfaces were heat-sealed by a heating plate kept at 200° C. and held at a pressure of 2 kg/cm² for 3 seconds, with the homo-PET laminated surfaces being located inside, to form a bag-shaped container. Further, the homo-PET laminated surfaces at the opening were heat-sealed for sealing (Examples 19 to 23).

To prepare control products, a laminate comprising polyethylenes laminated to the inside and outside of paper (outside PE 60 μm/base paper 300 g/m²/inside PE 40 μm) and a laminate having a biaxially oriented homo-PET film laminated via PE (outside PE 70 μm/base paper 300 g/m²/PE 15 μm/homo-PET film 12 μm/inside PE 30 μm) were formed. Using two of each of the above laminates, the inside PE laminated surfaces were heat-sealed in the same manner as mentioned above to form a bag-shaped container. Then, the PE laminated surfaces were heat-sealed in the same manner as mentioned above to seal the container (Comparative Examples 6 and 7).

At the center of a nearly cubic closed plastic case with a length of 50 cm, a width of 50 cm, and a height of 50 cm, 25 g of p-dichlorobenzene was placed, and each of the above closed bag-shaped containers was placed at an end portion of the bottom of the interior of the case, whereafter the container was allowed to stand at room temperature for 7 days. After a lapse of 7 days, a gas inside each container was partly sampled, and each sample was measured for the amount of p-dichlorobenzene having migrated into the container via the container wall (laminates).

The method of measurement was to heat the gas to 80° C., and then determine the contents of the head space by GC/MS. The results are shown in Table 7.

TABLE 7

| | Amount of p-dichlorobenzene (unit: ppm) |
|---|---|
| Ex. 19 | 3.0 |
| Ex. 20 | 2.2 |
| Ex. 21 | 3.1 |
| Ex. 22 | 1.1 |
| Ex. 23 | 8.5 |
| Comp. Ex. 6 | 134.9 |
| Comp. Ex. 7 | 2.4 |

In the type having laminated thereto the homo-PET film which has been so far known to show excellent barrier properties (Comparative Example 7), as compared with Comparative Example 6, permeation by p-dichlorobenzene was suppressed.

The homo-PET laminated papers of the present invention (Examples 19 to 23) were also found to have barrier properties comparative to those of the homo-PET film (Comparative Example 7). These results demonstrate the usefulness of the homo-PET laminated papers of the present invention (Examples 19 to 23).

Example 24 and Comparative Example 8

Ethanol (100 g) adjusted to a concentration of 25% was sealed up in each of the bag-shaped container obtained from the laminate of Example 1, which was used in Example 19, and the bag-shaped container of Comparative Example 6, and the homo-PET laminated surfaces of each container were seat-sealed to seal the container. Each container was placed in a constant temperature machine or thermostat at a temperature of 60° C., and held for 24 hours. Then, the ethanol inside the container was taken out, and its components were analyzed by GC/MS.

Chart 2 shows the results on the ethanol enclosed in the container obtained from the laminate of Example 1. Chart 3 shows the results on the ethanol enclosed in the container of Comparative Example 6.

The results on ethanol before enclosure in the container, as a control, are shown in Chart 1.

Furthermore, the homo-PET resin in the state of pellets before melting was immersed in ethanol, and an upper part of a container for the ethanol was closed. This container was placed in a thermostat at a temperature of 60° C., and held for 24 hours. Then, the ethanol inside the container was taken out, and its components were analyzed by GC/MS. The results are shown in Chart 4. The results of the GC/MS analysis of ethanol in which PE resin had been similarly immersed are shown in Chart 5.

Figure 2:
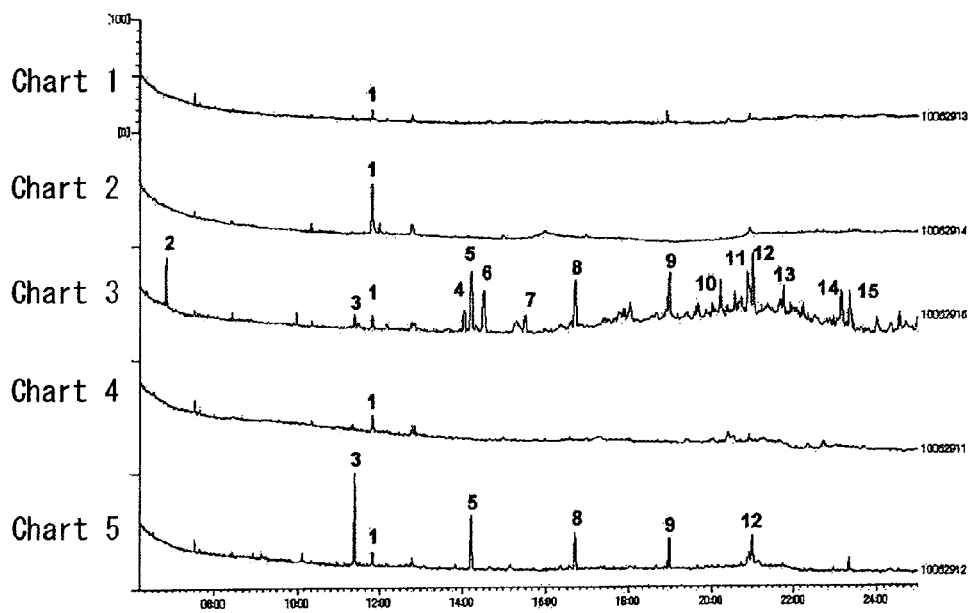
FIG. 2 is GC/MS charts of ethanol when the ethanol was accommodated as contents in a homo-PET-coated container and a PE-coated container.

The respective results are shown in FIG. 2.

As shown in FIG. 2, few impurities were detected in the ethanol before enclosure. Similarly, few peaks of impurities were observed, when the container formed from the laminate of the present invention having the homo-PET laminated thereto was used.

In connection with PE, a plurality of peaks were detected even when the pellets of the PE resin themselves were merely immersed in ethanol (Chart 5). Further, when the pellets of the PE resin were melted, the resulting PE melt was laminated to a paper, and a container thus produced was used, even more impurity peaks were detected.

These peaks of impurities have a possibility of affecting the purity of ethanol as the contents. As seen from these findings, when the laminate of the present invention is used as a base material for food and drink containers, it is clear that the containers are excellent in maintaining flavor. The homo-PET laminate type was suggested not to pose such problems.

Examples 25 and 26

An extrusion laminator was adjusted so that an air gap with respect to a die (width: about 110 cm) having a lip opening width adjusted to 0.8 mm (i.e., the distance from the lip opening of a T-die to a cup stock base paper to be coated) would be 13 to 14 cm. Homopolyethylene terephthalate at an extrusion temperature of 310° C. was extruded from the die at an extrusion pressure of 5.0 MPa, and coated on a 7 μm aluminum foil pasted on a cup stock base paper (230 g).

The coating thickness of the homopolyethylene terephthalate on the aluminum foil was 60 μm (Example 25) and 80 μm (Example 26), and the coating line speed was about 65 m/min and about 50 m/min. Simultaneously with the coating of the base paper, the coated base paper was passed between a chill roll (surface temperature: 22° C.) and a rubber roll to complete a laminate. In connection with these steps, the state of the extruded laminate was evaluated. The results are shown in Tables 8 and 9.

TABLE 8

| | Pressure | Selvage wave width of coated film | Uniformity of film thickness | Adhesion |
|---|---|---|---|---|
| Ex. 19 (60 μm) | 5.0 | ◯ | ◯ | ◯ |
| Ex. 18 (80 μm) | 5.0 | ◯ | ◯ | ◯ |

TABLE 9

| | Homo-PET surface/homo-PET surface | | | |
|---|---|---|---|---|
| | 160° C. | 170° C. | 190° C. | 220° C. |
| Ex. 19 (60 μm) | ◎ | ◎ | ◎ | ◎ |
| Ex. 20 (80 μm) | ◎ | ◎ | ◎ | ◎ |

INDUSTRIAL APPLICABILITY

The laminate of the present invention has a coating provided on a paper base material directly, without ah adhesive layer being interposed therebetween, the coating comprising inexpensive and easily available homopolyethylene terephthalate and having a uniform film thickness. Thus, this laminate is excellent in economy. Moreover, the laminate is also excellent in heat resistance, aroma barrier properties, and heat sealability, and thus can be used in various containers. Furthermore, because of its excellence in heat resistance, the laminate can be put to microwave heat-cooking uses including fats and oils.

Besides, when the container composed of the laminate of the present invention is used as a container enclosing alcohol, impurities derived from the laminated layer do not solve out in the alcohol as the contents, so that the inherent flavor of alcohol is not spoiled. Since the container composed of the laminate of the present invention has the excellent effect of maintaining the flavor of the contents, as noted above, it can be used preferably for alcohol-containing foods and drinks such as alcoholic beverages.

It goes without saying that the container composed of the laminate of the present invention can be used similarly preferably for all alcohol-free foods.

DESCRIPTION OF THE NUMERALS

1 T-die, 2 Lip, 3 Chill roll, 4 Pressure roll

The invention claimed is:

1. A method for producing, by an extrusion coating method, a heat-sealable laminate by directly applying a heat-sealable coating composed of a homopolyethylene terephthalate onto the surface of a paper substrate or onto the surface of an aluminum foil laminated on the surface of the paper substrate, wherein said homopolyethylene terephthalate has an intrinsic viscosity in a range of from 0.72 to 0.88 dl/g, the temperature of the homopolyethylene terephthalate when it is melt-extruded by the extrusion-coating method is in a range of from Tm+25° C. to Tm+60° C. based on a melting point (Tm) of said homopolyethylene terephthalate, the extrusion pressure is in a range of from 4.0 to 6.0 MPa, and an air gap, expressed as a distance of from a lip opening of a T-die to the surface of the paper substrate or to the surface of the aluminum foil, is 25 cm or less, and a thickness of the homopolyethylene terephthalate coating varies in a range of less than ±20%.

\* \* \* \* \*